United States Patent

Ikeda et al.

[11] 3,914,273
[45] Oct. 21, 1975

[54] METHINE COMPOUNDS

[75] Inventors: Tsuneo Ikeda, Toyonaka; Katsunobu Sato, Minoo; Hiroshi Sugiyama, Ashiya, all of Japan

[73] Assignee: Sumitomo Chemical Company, Ltd., Osaka, Japan

[22] Filed: Dec. 29, 1972

[21] Appl. No.: 319,816

[30] Foreign Application Priority Data
Apr. 14, 1972 Japan.............................. 47-37916
Dec. 28, 1972 Japan.............................. 47-3484

[52] U.S. Cl................. 260/465 D; 8/178 R; 8/179; 260/243 R; 260/247.2 A; 260/247.2 B; 260/247.2 R; 260/247.7 R; 260/256.4 Q; 260/256.5 R; 260/268 PH; 260/293.75; 260/293.76; 260/326.47; 260/326.5 M; 260/465 E; 260/471 R; 260/519; 260/559 A
[51] Int. Cl.²..................................... C07C 121/80
[58] Field of Search................... 260/465 E, 465 D

[56] References Cited
UNITED STATES PATENTS
3,149,148  9/1964  Kladko et al. .................. 260/465
3,514,471  5/1970  Cyanagisawa et al. ......... 260/465 X Primary Examiner—Elbert L. Roberts
Assistant Examiner—Dolph H. Torrence
Attorney, Agent, or Firm—Sughrue, Rothwell, Mion, Zinn & Macpeak

[57] ABSTRACT

A methine compound of the formula,

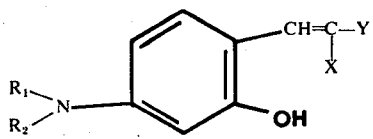

which is a useful intermediate for the production of a yellow coumarine dye of the formula

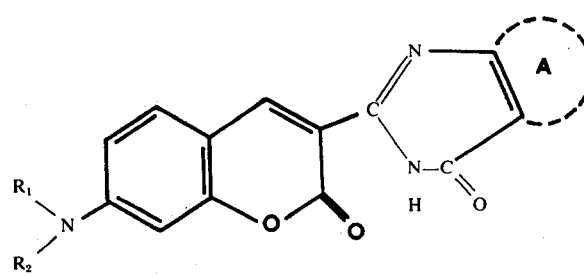

The methine compound is prepared by condensing an aldehyde derivative of the formula

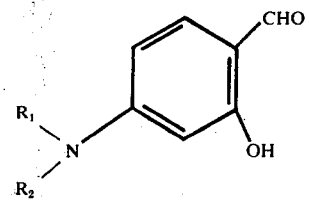

with a compound of the formula
    X—CH₂—Y.

The yellow coumarine dye is prepared by condensing the methine compound with one of the following:

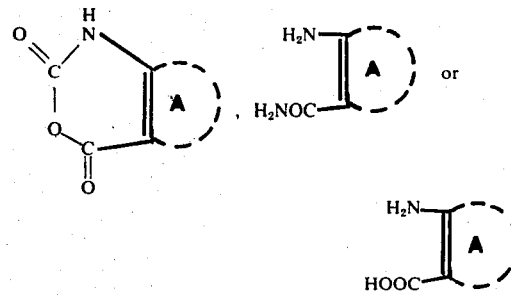

Each of the $R_1$ and $R_2$ is hydrogen, substituted or unsubstituted alkyl or cycloalkyl, or $R_1$ and $R_2$ may form a heterocyclic ring together with the nitrogen atom and other atoms; X is cyano, carbamoyl, carboalkoxy or carboxylic acid; and Y is carbamoyl or cyano, and A is a benzene or naphthalene ring which may be substituted.

3 Claims, No Drawings

METHINE COMPOUNDS

BACKGROUND OF THE INVENTION

1. Field of the Invention

This invention relates to novel methine compounds, a process for preparing such methine compounds and to a process for preparing a coumarine derivative (yellow dye) using such methine compounds.

2. Description of the Prior Art

The coumarine derivatives described in Belgian Pat. No. 745740-Q and Dutch Pat. No. 7001885 are suitable for dyeing and printing hydrophobic fibers such as acetate, polyester or polyamide fibers and are also used for coloring synthetic resins such as polyethylene, polystyrene, polypropylene, polyvinyl chloride or polymethyl methacrylate. They emit a strong yellow fluorescence under ultraviolet rays or sunlight, and give a very vivid yellow color having good fastness to light.

Until the efforts of the present inventors, however, no process has been available to the prior art for producing the coumarine derivatives set out in the above patents which is sufficient for industrial production.

SUMMARY OF THE INVENTION

The present inventors, after extensive studies, have reached a process for the production of such useful coumarine derivatives with industrial advantages, and have found novel methine compounds which are highly active, and which can be reacted with various compounds, which methine compounds are especially useful for the production of such coumarine derivatives with industrial advantages.

It is one object of this invention to provide novel methine compounds reactive with various compounds.

Another object of this invention is to provide a process for preparing yellow dyes of the coumarine type with great commercial advantages using such novel methine compounds.

The present invention provides a methine compound of formula (I)

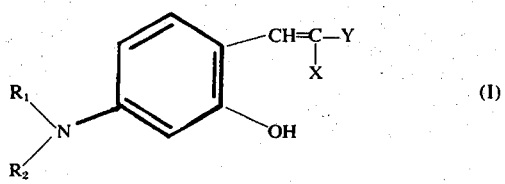

(I)

wherein each of $R_1$ and $R_2$ is hydrogen atom, a substituted or unsubstituted alkyl group or a cycloalkyl group; $R_1$ and $R_2$ may form a heterocyclic ring together with the nitrogen atom and other atoms; X is cyano group, carbamoyl group, a carboalkoxy group or carboxylic acid group; and Y is carbamoyl group or cyano; provides a process for preparing the methine compound of formula (I), which process comprises condensing an aldehyde derivative of formula (II),

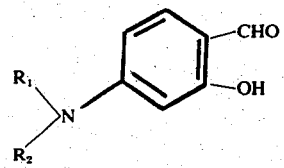

wherein $R_1$ and $R_2$ are the same as defined above, with a compound of formula (III).

X — CH$_2$ — Y (III)

wherein X and Y are the same as defined above, in an inert organic solvent at room temperature or at an elevated temperature; and also provides a process for preparing a dye of general formula (IV);

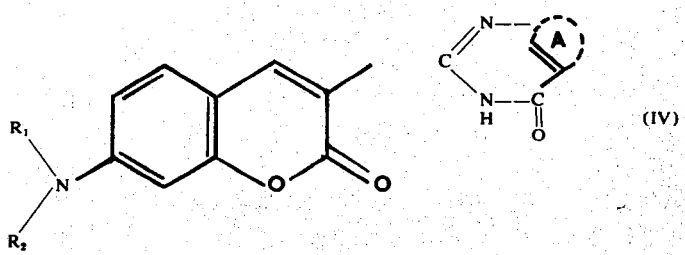

(IV)

wherein $R_1$ and $R_2$ are the same as defined above, and A is a benzene or naphthalene ring which is unsubstituted or substituted with at least one group other than a water-soluble group, such as a carboxylic group or sulfonic acid group, which comprises condensing the methine compound of formula (I) with a compound selected from the group consisting of isatoic acid derivatives of formula (V),

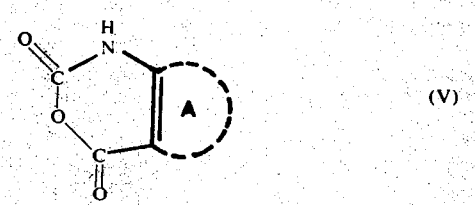

(V)

wherein A is the same as defined above, anthranilic acid amide derivatives of formula (VI),

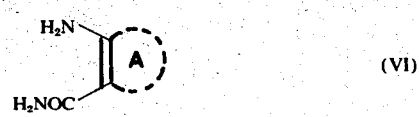

(VI)

wherein A is the same as defined above, said anthranilic acid derivatives of formula (VII),

(VII)

wherein A is the same as defined above, in an inert organic solvent at an elevated temperature.

In the present invention, the term "alkyl" is intended to mean an alkyl group having 1 to 4 carbon atoms. Examples of the alkyl group and substituted alkyl group include the following: methyl group, ethyl group, β-chloroethyl group, β-hydroxyethyl group, β-methoxyethyl group, β-acetoxyethyl group, β-cyanoethyl group, β-carbomethoxyethyl group, benzyl group or cyclohexyl group. Examples of the heterocyclic ring formed by $R_1$ and $R_2$ together with the nitrogen atom and other atoms are a piperindino ring, pyrrolidino ring and morpolino ring.

DETAILED DESCRIPTION OF THE INVENTION

The novel methine compound of the formula (I) is prepared by reacting the aldehyde derivative of formula (II) with the compound of formula (III) in an inert organic solvent. Preferably, the condensation reaction is carried out at about 0°C to about 50°C. Depending upon the kind of the solvent, a side-reaction may take place at a temperature higher than 50°C. to cause the self-cyclization of the methine compound to a coumarine ring.

Examples of suitable solvents are alcohols such as methanol, ethanol, isopropanol, isobutanol or ethylene glycol monoalkyl ethers aliphatic solvents such as dioxane, diemthyl formamide, dimethyl sulfoxide or chloroform, and aromatic solvents such as chlorobenzene, nitrobenzene or toluene.

Specific examples of compounds within formula (III) are cyanoacetamide, malonic acid diamide, malonic acid monoamide and carboethoxy acetamide.

In order to promote the reaction, a basic catalyst such as piperidine, triethylamine, diethylamine or sodium alcoholate may be added to the reaction system.

After completion of the reaction, the reaction mixture is sufficiently cooled to precipitate crystals of the desired product. By filtering the precipitated crystals, a final product of high quality can be obtained.

The reaction for the preparation of the yellow coumarine dye of formula (IV) is carried out by condensing the novel methine compound of formula (I) with a compound selected from those of formulae (V), (VI) or (VII) in an inert organic solvent at an elevated temperature. Examples of suitable solvents are aromatic solvents such as chlorobenzene, o-dichlorobenzene, nitrobenzene, toluene or xylene, aliphatic solvents such as solvent naphtha, tetrachloroethylene, tetrachloroethane or trichloroethylene, alcohols such as ethanol, isopropanol, isobutanol or ethylene glycol monoalkyl ethers, and other solvents such as dimethyl formamide, dimethyl acetamide, dimethyl sulfoxide, diphenyl or diphenyl ether. The temperature may vary over a wide range according to the solvent to be used, but preferably the reaction temperature is from 70°C to 160°C.

It is not especially necessary to add a reaction promotor, but if desired, a compound such as boric acid, aluminum chloride, zinc chloride, benzene or toluenesulfonic acid may be added as the promoter.

The isatoic acid derivative of formula (V) can be obtained in a known manner by reacting a substituted or unsubstituted anthranilic acid or o-aminonaphthoic acid with phosgene, or by oxidizing phthalionide or a naphthalenedicarboxylic acid imide.

In the compounds of formulae (IV), (V), (VI) and (VII), examples of the substituents attached to ring A are halogen atoms, lower alkyl groups, lower alkoxy groups, nitro group, thiocyano group, alkanoyl groups, alkylsulfonyl groups, carboalkoxy groups, sulfonic acid alkyl ester groups, sulfonic acid amide groups, N-alkyl or N,N-dialkylsulfonic acid amide groups.

The condensation reaction for producing the coumarine dye includes two cyclization reactions. Usually, however, these cyclization reactions take place simultaneously or with a very slight time difference, and therefore different intermediate cyclized products can hardly be detected. Since the reactions take place almost simultaneously and in good yields, operations to recover the intermediate product are not required, and the process proves commercially advantageous.

If the same solvent is used both in the preparation of the methine compound and in the preparation of the coumarine dye using the methine compound, the condensation reaction for preparing the dye and the methine compound can be carried out successively without the need for an intermediate recovery of the methine compound.

With the progress of the reaction for preparing the dye, carbon dioxide gas and ammonia, alcohol, water, etc. are formed corresponding to group X in the methine compound. These byproducts can be released singly or as azeotropes with a soluvent out of the reaction system.

The invention will now be illustrated by the following Examples, in which all parts are by weight.

EXAMPLE 1

Into a reactor were charged 600 parts of methanol, 42 parts of cyanoacetamide, 96.5 parts of 4-N,N-diethylamino-2-hydroxybenzaldehyde and 5.3 parts of piperidine, and the mixture was stirred for 5 hours at 40°–45°C. The reaction mixture was cooled to 10°C., and filtered. The resulting crystals were washed with 150 parts of methanol and dried to yield 110 parts of yellow crystals, which had a melting point of 167°–168°C. and which were identified by elementary analysis and the infrared absorption spectrum thereof to be a compound of the following formula,

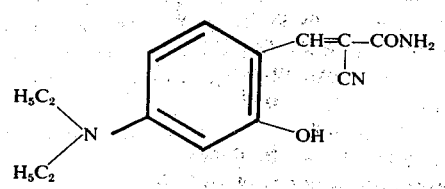

EXAMPLE 2

Example 1 was repeated except that 51 parts of malonic acid diamide was used instead of 42 parts of cyanoacetamide. Elementary analysis showed that the product was a compound of the following formula.

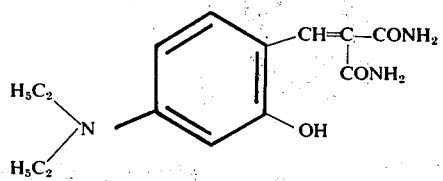

EXAMPLE 3

Into a reactor were charged 600 parts of methanol, 42 parts of cyanoacetamide, 82.5 parts of 4-N,N-dimethylamino-2-hydroxybenzaldehyde and 5.3 parts of piperidine, and the mixture was stirred for 5 hours at 40°–45°C. The reaction mixture was cooled to 10°C., and filtered. The resulting crystals were washed with 150 parts of methanol, and dried to yield 98 parts of yellow crystals, which showed a melting point of 182°–183°C. The crystals were identified to be a compound of the following formula by elementary analysis and the infrared absorption spectrum thereof.

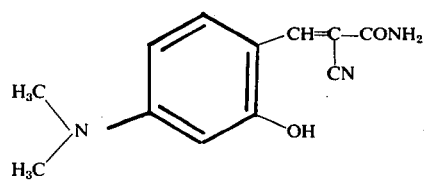

10°C. and filtered. The resulting crystals were washed with 150 parts of methanol, and dried to yield 135 parts of yellow crystals having a melting point of 117°–118°C. The yellow crystals were identified to be a compound of the following formula by elementary analysis and the infrared absorption spectrum thereof.

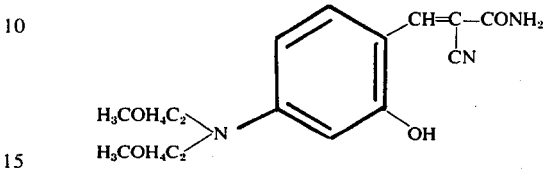

EXAMPLES 5 to 31

The procedure similar to that of Example 1 were repeated to yield the following novel methine compounds.

| Examples | $R_1$ | $R_2$ | X | Y |
|---|---|---|---|---|
| 5 | $-C_2H_5$ | $-C_2H_5$ | $-COOCH_3$ | $-CONH_2$ |
| 6 | $-C_2H_5$ | $-C_2H_5$ | $-COOH$ | $-CONH_2$ |
| 7 | $-C_2H_5$ | $-C_2H_5$ | $-CONH_2$ | $-CN$ |
| 8 | $-H$ | $-H$ | $-CN$ | $-CONH_2$ |
| 9 | $-C_2H_5$ | $-C_2H_4Cl$ | $-CN$ | $-CONH_2$ |
| 10 | $-C_2H_5$ | $-C_2H_4OH$ | $-CN$ | $-CONH_2$ |
| 11 | $-CH_2-C_6H_5$ | $-H$ | $-CN$ | $-CONH_2$ |
| 12 | $-CH_2-CH_2-C_6H_5$ | $-H$ | $-CN$ | $-CONH_2$ |
| 13 | $-C_6H_{11}$ | $-H$ | $-CN$ | $-CONH_2$ |
| 14 | $-C_2H_5$ | $-C_2H_4CN$ | $-CN$ | $-CONH_2$ |
| 15 | $-C_2H_4OCOCH_3$ | $-C_2H_4OCOCH_3$ | $-CN$ | $-CONH_2$ |
| 16 | $-C_2H_4COOCH_3$ | $-C_2H_4COOCH_3$ | $-CN$ | $-CONH_2$ |
| 17 | $-C_2H_4OCOOCH_3$ | $-C_2H_4OCOOCH_3$ | $-CN$ | $-CONH_2$ |
| 18 | $O(CH_2CH_2)_2N-$ | | $-CN$ | $-CONH_2$ |
| 19 | $S(CH_2CH_2)_2N-$ | | $-CN$ | $-CONH_2$ |
| 20 | $HN(CH_2CH_2)_2N-$ | | $-CN$ | $-CONH_2$ |
| 21 | $H_2C(CH_2CH_2)_2N-$ | | $-CN$ | $-CONH_2$ |
| 22 | $-C_2H_5$ | $-C_2H_5$ | $-COOC_2H_5$ | $-CONH_2$ |
| 23 | $-C_4H_9$ | $-C_4H_9$ | $-CN$ | $-CONH_2$ |
| 24 | $-C_2H_4OC_2H_5$ | $-C_2H_4OC_2H_5$ | $-CN$ | $-CONH_2$ |
| 25 | $-C_2H_4OC_4H_9$ | $-C_2H_4OC_4H_9$ | $-CN$ | $-CONH_2$ |
| 26 | $-C_2H_4OCOC_2H_5$ | $-C_2H_4OCOC_2H_5$ | $-CN$ | $-CONH_2$ |
| 27 | $-C_2H_4OCOOC_2H_5$ | $-C_2H_4OCOOC_2H_5$ | $-CN$ | $-CONH_2$ |
| 28 | $-C_2H_4O-C_6H_5$ | $-H$ | $-CN$ | $-CONH_2$ |
| 29 | $-CH_2COOC_2H_5$ | $-H$ | $-CN$ | $-CONH_2$ |
| 30 | $-CH_2COOCH_3$ | $-H$ | $-CN$ | $-CONH_2$ |
| 31 | $-H$ | $-H$ | $-CN$ | $-CONH_2$ |

EXAMPLE 4

Into a reactor were charged 600 parts of methanol, 42 parts of cyanoacetamide, 126.5 parts of 4-N,N-dimethoxyethylamino-2-hydroxybenzaldehyde and 5.3 parts of piperidine, and the mixture was stirred for 5 hours at 40-45°C. The reaction mixture was cooled to

EXAMPLE 32

25.9 Parts of the methine compound obtained in Example 1 and 19.2 parts of isatoic acid anhydride were put into 150 parts of dimethyl formamide, and the mixture was stirred for 5 hours at 110°–120°C. The reaction mixture was filtered at room temperature. The resulting crystals were first washed with 50 parts of dimethyl formamide and then with 100 parts of methanol, and dried to yield 27 parts of yellow crystals having a melting point of 267°–268°C. The yellow crystals were identified as a compound of the following formula by elementary analysis.

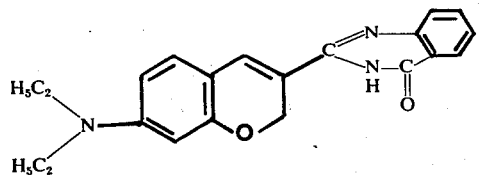

Acetate, polyester and polyamide dyed with this compound showed a fluorescent yellow color and had good fastness characteristics, e.g., in particular, light fastness. Other fastness characteristics such as sublimation fastness and washing features were also good.

EXAMPLE 33

27.7 Parts of the methine compounds obtained in Example 2 and 19.2 parts of isatoic acid anhydride were put into 150 parts nitrobenzene, and the mixture was stirred for 3 hours at 120°–140°C. The reaction product was cooled to 80°C. 75 Parts of methanol was added dropwise over the course of one hour, and after the end of addition, the mixture was stirred for 1 hour at 25°C. The precipitated crystals were filtered, washed with 50 parts of methanol, and dried to yield 25.2 parts of yellow crystals which were found to be the same compound as that obtained in Example 32.

Similar products were obtained when the methine compounds obtained in Examples 6 and 22 were used instead of the methine compound obtained in Example 2.

EXAMPLE 34

25.9 Parts of the methine compound obtained in Example 1 and 13.6 parts of anthranilic acid amide were put into 150 parts of dimethyl foramide, and the mixture was stirred for 5 hours at 110°–120°C. The product was filtered at room temperature. The resulting crystals were first washed with 50 parts of dimethyl formamide and then with 100 parts of methanol, and dried to yield 27 parts of yellow crystals which had a melting point of 267°–268°C. The crystals were identified to be a compound of the following formula by elementary analysis.

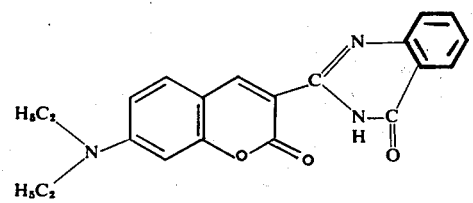

Acetate, polyester and polyamide dyed with this compound showed a fluorescent yellow color and had good fastness characteristics as in Example 32.

EXAMPLE 35

27.7 Parts of the methine compound obtained in Example 2 and 13.6 parts of anthranilic acid amide were put into 150 parts of nitrobenzene, and the mixture was stirred for 3 hours at 120-140°C., followed by cooling to 80°C. Methanol (75 parts) was added dropwise over the course of one hour, and after the end of addition, the mixture was stirred for 1 hour at 25°C. The crystals which precipitated were filtered, washed with 50 parts of methanol, and dried to yield 25.2 parts of yellow crystals which were found to be the same compound as that obtained in Example 34.

Similar products were obtained when the methine compounds obtained in Examples 6 and 22 were used instead of the methine compound obtained in Example 2.

EXAMPLE 36

25.9 Parts of the methine compound obtained in Example 1 and 13.7 parts of anthranilic acid were put into 150 parts of dimethyl formamide, and the mixture was stirred for 5 hours at 110°–120°C. The product was filtered at room temperature. The resulting crystals were washed first with 50 parts of dimethyl formamide and then with 100 parts of methanol, and dried to yield 27 parts of yellow crystals, which had a melting point of 267°–268°C. The crystals were identified to be a compound of the following formula by elementary analysis.

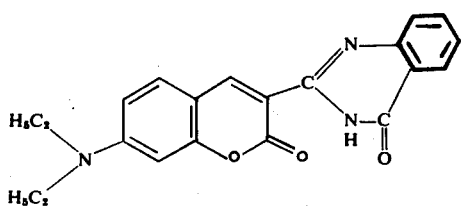

Acetate, polyester and polyamide dyed with this compound showed a fluorescent yellow color and had good fastness characteristics as in Example 32.

EXAMPLE 37

27.7 Parts of the methine compound obtained in Example 2 and 13.7 parts of anthranilic acid were put into 150 parts of nitrobenzene, and the mixture was stirred for 3 hours at 120°–140°C., followed by cooling to 80°C. Methanol (75 parts) was added dropwise over the course of one hour, and after the end of addition, the mixture was stirred for 1 hour at 25°C. The precipitated crystals were filtered, washed with 50 parts of methanol and dried to yield 25.2 parts of yellow crystals which were found to be the same compound as that obtained in Example 36.

Similar products were obtained when the methine compounds obtained in Examples 6 and 22 were used instead of the methine compound obtained in Example 2.

EXAMPLES 38 to 76

Coumarine dyes shown below were prepared in the same way as set forth in Examples 32–37.

| Examples | R₁ | R₂ |  |
|---|---|---|---|
| 38 | —C₂H₅ | —C₂H₅ | 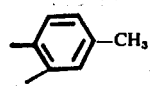 |
| 39 | —C₂H₅ | —C₂H₅ | 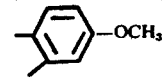 |
| 40 | —C₂H₅ | —C₂H₅ | 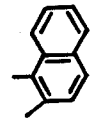 |
| 41 | —CH₃ | —CH₃ |  |
| 42 | —C₂H₅ | —C₂H₅ | 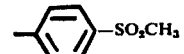 |
| 43 | —C₂H₅ | —C₂H₅ | 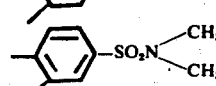 |
| 44 | —C₂H₄CN | —CH₃ | 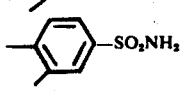 |
| 45 | —C₂H₄Cl | —CH₃ |  |
| 46 | —C₂H₄OH | —CH₃ |  |
| 47 | C₆H₅—CH₂— | —H | 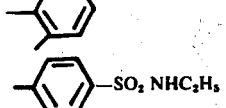 |
| 48 | C₆H₅—CH₂CH₂— | —H |  |
| 49 | C₆H₁₁— | —H | 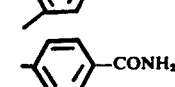 |
| 50 | —CH₃ | —CH₃ | 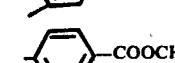 |
| 51 | —C₂H₅ | —C₂H₅ | 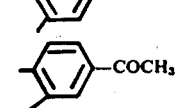 |
| 52 | —C₂H₅ | —C₂H₅ | 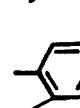 |
| 53 | —C₂H₅ | —C₂H₅ | 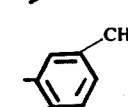 |
| 54 | —C₂H₅ | —C₂H₅ | 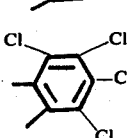 |
| 55 | —C₂H₅ | —C₂H₅ | 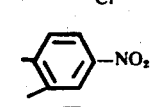 |
| 56 | —C₂H₅ | —C₂H₅ | 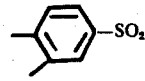 |

―Continued
| Examples | R₁ | R₂ | |
|---|---|---|---|
| 57 | —C₂H₅ | —C₂H₅ | 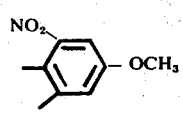 |
| 58 | —C₂H₅ | —C₂H₅ | 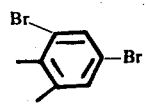 |
| 59 | —C₂H₄OCH₃ | —C₂H₄OCH₃ | 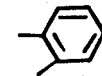 |
| 60 | —C₂H₄OCOCH₃ | —C₂H₄OCOCH₃ | 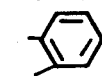 |
| 61 | —C₂H₄COOCH₃ | —C₂H₄COOCH₃ | 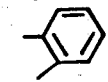 |
| 62 | —CH₃ | —CH₃ | 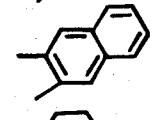 |
| 63 | 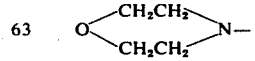 | | 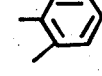 |
| 64 | 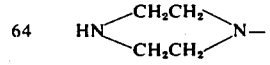 | | 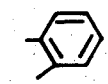 |
| 65 | 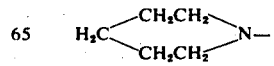 | | 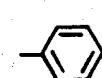 |
| 66 | 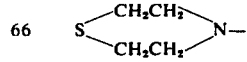 | | 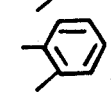 |
| 67 | —C₄H₉ | —C₄H₉ | 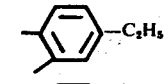 |
| 68 | —C₂H₄OC₂H₅ | —C₂H₄OC₂H₅ | 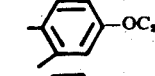 |
| 69 | —C₂H₄OC₄H₉ | —C₂H₄OC₄H₉ | 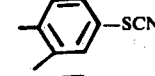 |
| 70 | —C₂H₄OCOC₂H₅ | —C₂H₄OCOC₂H₅ |  |
| 71 | —C₂H₄OCOOCH₃ | —C₂H₄OCOOCH₃ | 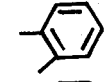 |
| 72 | —C₂H₄OCOOC₂H₅ | —C₂H₄OCOOC₂H₅ | 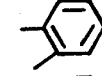 |
| 73 | 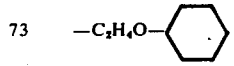 | —H | 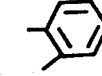 |
| 74 | —CH₂COOC₂H₅ | —H | 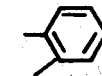 |
| 75 | —CH₂COOCH₃ | —H | 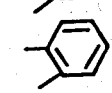 |
| 76 | —H | —H | 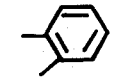 |

EXAMPLE 77

A mixture of 42 parts of cyanoacetomide, 96.5 parts of 4-N,N-diethylamino-2-hydroxybenzaldehyde, 5.3 parts of piperidine and 600 parts of nitrobenzene was stirred for 5 hours at 30 to 40°C., and thereafter heated to 90° to 100°C. 89.6 parts of isatoic anhydride was added dropwise thereto over a one hour period while the system was maintained at 90° to 100°C., and the mixture was further stirred for 2 hours at 100 to 110°C. After lowering the temperature to 70°C., 300 parts of methanol was added dropwise to the reaction mixture. The temperature was further lowered to 20°C and thereafter the reaction mixture was stirred for 2 hours at 20°C. The deposited crystals were filtered, washed with 300 parts of methanol, and then with water, and dried, whereby 115 parts of yellow crystals was obtained. This was confirmed to be the same compound as in Example 32.

While the invention has been described in detail and with reference to specific embodiments thereof, it will be apparent to one skilled in the art that various changes and modifications can be made therein without departing from the spirit and scope thereof.

What is claimed is:

1. A compound of the formula,

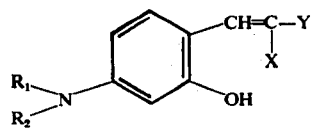

wherein each of $R_1$ and $R_2$ is hydrogen, $C_1$-$C_4$ alkyl, $C_1$-$C_4$ alkyl substituted by chlorine, hydroxy, methoxy, acetoxy, cyano, carbomethoxy or phenyl, or cyclohexyl, X is cyano, and Y is carbamoyl or cyano.

2. The compound according to claim 1 wherein each of $R_1$ and $R_2$ is $C_1$-$C_4$ alkyl.

3. A compound of the formula,

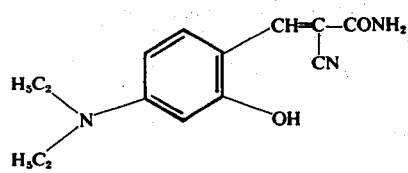

* * * * *